United States Patent Office 3,362,921
Patented Jan. 9, 1968

3,362,921
NOVEL ELASTOMERIC PRODUCTS OBTAINED FROM PREPOLYMER COMPOSITIONS
Arthur Ehrlich, Brooklyn, N.Y., and Temple C. Patton, Westfield, and Malcolm Kent Smith, Mountainside, N.J., assignors to The Baker Castor Oil Company, Bayonne, N.J., a corporation of New Jersey
No Drawing. Continuation of abandoned application Ser. No. 443,637, Mar. 29, 1965. This application Apr. 8, 1965, Ser. No. 446,719
15 Claims. (Cl. 260—18)

ABSTRACT OF THE DISCLOSURE

Urethane elastomers are described which comprise the reaction product of a urethane prepolymer obtained from the reaction of at least one polyfunctional compound containing active-hydrogen groups with an organic diisocyanate, the prepolymer cured with an ester of a polyhydric alcohol of at least four hydroxy groups and a hydroxy and/or epoxy aliphatic acid of at least twelve carbon atoms, such as pentaerythritol monoricinoleate. These elastomers have good electrical and physical properties, particularly improved tensile strength and hardness, making them useful for potting and encapsulating electronic components.

---

This application is a continuation of our copending application Ser. No. 443,637, filed Mar. 29, 1965, for Novel Elastomeric Products Obtained From Prepolymer Compositions, now abandoned, and a continuation-in-part of our copending application Ser. No. 442,507, filed Mar. 24, 1965, for Castor Oil, Diisocyanate and Hydroxy Aliphatic Acid Prepolymers and Elastomeric Products Prepared Therefrom.

This invention relates to novel cured elastomeric products, especially those which are obtained from prepolymer compositions. More particularly, this invention relates to new and useful elastomeric products prepared by the reaction of esters of polyhydric alcohols containing at least four hydroxy groups and an aliphatic acid of at least 12 carbon atoms and one or more epoxy and/or hydroxy groups per molecule, with the prepolymer compositions.

In our said copending application there are disclosed and claimed novel prepolymer compositions and cured elastomeric products obtained therefrom by reaction with conventional prior art curing agents. It has now been discovered that when those novel prepolymers, as well as prior art prepolymer compositions, are cured with esters of polyhydric alcohols containing at least four hydroxy groups and an aliphatic acid of at least 12 carbon atoms and one or more hydroxy and/or epoxy groups, elastomeric products are obtained which exhibit superior electrical and physical properties in comparison to prepolymer compositions cured with the heretofore known curing agents.

The reaction of diisocyanates with polyfunctional compounds containing active-hydrogen groups to produce prepolymer compositions is known. The prepolymers prepared from an active-hydrogen containing material are obtained by the reaction of a diisocyanate with active-hydrogen containing materials including polyesters, castor oil, polyester amides, and polyalkylene ether glycols as well as mixtures of two or more of these classes of polyfunctional compounds. These known prepolymer compositions may be further reacted with conventional curing agents such as dihydric alcohols, castor oil, glycol esters of hydroxy carboxylic acids, polyalkylene glycols, etc. When these prior art prepolymers are further reacted with these conventional curing agents, elastomeric products are obtained having low tensile strength and elongation, which is a serious disadvantage when the product is to be used as an adhesive, coating or encapsulant, since on continued handling it tends to break, flake off or be pulled away from the substrate. Another disadvantage frequently present in the heretofore utilized prepolymers is excessive shrinkage upon being cured.

In the casting resin field there is a need for materials with low shrinkage, low water or moisture absorption, aging stability, heat stability and good electrical properties, such as low dissipation and volume resistivity, for use in potting and encapsulating electrical components.

Therefore, one aspect of the present invention is to provide cured elastomeric products having good electrical properties as determined by the dielectric constant and dissipation factor, good physical properties such as low shrinkage upon curing, low water absorption, aging stability, heat stability, tensile strength and elongation. All of these properties make the products of the present invention highly useful as floccing adhesives, paper coatings, potting compositions and encapsulation compounds for electronic parts.

Another aspect of this invention is to provide a novel class of curing agents which significantly improve the electrical and physical properties of prepolymer compositions.

The foregoing aspects of this invention as well as others will be apparent as the description proceeds.

The preferred prepolymer compositions used in the present invention for producing the cured products are disclosed and claimed in our said copending application. However, cured products having good electrical and physical properties are also obtained when prepolymer compositions disclosed in the prior art are used. These prepolymers are prepared by reacting an active-hydrogen containing polymeric material within particular molecular weight and acid number ranges with a controlled amount of a diisocyanate, with the diisocyanate being present in greater than stoichiometric amounts. Examples of active-hydrogen containing polymeric materials which may be used are polyesters, castor oil, polyester amides and polyalkylene ether glycols. Prepolymer compositions prepared by reacting a diisocyanate with active-hydrogen containing materials as fully disclosed in United States Patents Nos. 2,625,531, 2,625,532, 2,625,535, 2,692,873, and 2,702,797 are useful in the present invention.

According to this invention, it has been found that esters of polyhydric alcohols containing at least four hydroxy groups and an aliphatic acid of at least 12 carbon atoms and one or more hydroxy and/or epoxy groups per molecule, are useful in curing prepolymer compositions, wherein the resulting product has physical and electrical properties superior to the prepolymer compositions cured with conventional curing agents. The use of the curing agents of this invention for reaction with prepolymer compositions has not heretofore been suggested by the art. The hydroxy and/or epoxy aliphatic acids of at least 12 carbon atoms that form an ester, when reacted with polyhydric alcohols of at least four hydroxy groups, may be saturated or unsaturated. Illustrative of this class of hydroxy acids are the following: ricinoleic acid, 12-hydroxy stearic acid, hydroxy palmitic acid, hydroxy pentadecanoic acid, hydroxy myristic acid, and hydroxy cerotic acid, as well as epoxy derivatives of these acids. The length of the carbon chain of the hydroxy and/or epoxy aliphatic acids is only limited to the extent that commercially there are available aliphatic acids having about 22 carbon atoms. However, hydroxy aliphatic acids having more than 22 carbon atoms are also contemplated.

Among the polyhydric alcohols, containing at least four hydroxy groups, that may be reacted with hydroxy and/or epoxy aliphatic acids to form an ester, are the following: pentaerythritol, erythritol, arabitol, mannitol, sorbitol, sucrose and cellulose.

The esters which are useful as curing agents for the prepolymers are prepared according to known procedures, such as direct esterification resulting from reaction of a hydroxy and/or epoxy aliphatic acid with a polyhydric alcohol containing at least four hydroxy groups. Other well known processes for producing esters can also be employed. The preferred curing agent for the prepolymers is pentaerythritol monoricinoleate. Other esters which can be used include pentaerythritol 12-hydroxy stearate, sorbitol monoricinoleate, erythritol monoricinoleate, cellulose hydroxy stearate, as well as any other esters which would result from the reaction of the above enumerated polyhydric alcohols and aliphatic acids.

Also contemplated are diesters, triesters and tetraesters such as pentaerythritol diricinoleate, pentaerythritol triricinoleate, pentaerythritol tetraricinoleate, etc.

The preferred prepolymers, which are reacted with a curing agent are obtained from the reaction of castor oil, a glycol or a polyglycol monoester of a hydroxy carboxylic acid of at least 12 carbon atoms and an organic diisocyanate, as disclosed in our copending application referred to herein.

The glycol and polyglycol monoesters of hydroxy carboxylic acids of at least 12 carbon atoms are prepared by reacting a hydroxy carboxylic acid of at least 12 carbon atoms with dihydric lower aliphatic alcohols or ether alcohols, such as ethylene glycol, propylene glycol, hexylene glycol, diethylene glycol, dipropylene glycol, hexamethylene glycol, and polyethylene and polypropylene glycols, according to procedures well known in the prior art such as direct esterification. These hydroxy monocarboxylic acids may be saturated or unsaturated. Illustrative of this class of hydroxy acids are the following: ricinoleic acid, 12-hydroxy stearic acid, hydroxy palmitic acid, hydroxy pentadecanoic acid, hydroxy myristic acid, hydroxy cerotic acid, etc.

The preferred esters used in the preparation of these prepolymers disclosed in our copending application are propylene glycol monoricinoleate, ethylene glycol monoricinoleate, and propylene glycol 12-hydroxy stearate. Also other esters are useful in the preparation of the prepolymers including diethylene glycol monoricinoleate, polyethylene glycol monoricinoleate, dipropylene glycol monoricinoleate, polypropylene glycol 12-hydroxy stearate, propylene glycol hydroxy palmitate, etc.

The organic diisocyanates used in the preparation of the prepolymer compositions are those which are known in the art to be useful in the preparation of such compositions by reaction with active-hydrogen containing materials. Arylene diisocyanates as represented by the diisocyanates of the benzene and naphthalene series or mixtures of these compounds are preferred. Illustrative of arylene diisocyanates that may be employed are the following: tolylene diisocyanate (2,4/2,6), toluene 2,4 diisocyanate, toluene 2,6 diisocyanate, m-phenylene diisocyanate, xenylene 4,4'-diisocyanate, naphthalene 1,5'-diisocyanate, 3,3'-bitolylene 4,4'-diisocyanate, diphenylene methane 4,4'-diisocyanate, 1-chlorophenylene 2,4-diisocyanate, dianisidine diisocyanate and diphenylene ether 4,4'-diisocyanate. Other arylene diisocyanates which are useful include lower alkyl substituted derivatives, halogen substituted derivatives and also alkoxy substituted derivatives. Other aromatic hydrocarbon diisocyanates as well as aliphatic polyisocyanates may be used but the latter are not as reactive as aromatic diisocyanates.

The castor oil that may be used to prepare the prepolymers can be represented by any commercial grade of castor oil. Also useful are mixtures of castor oil and partially epoxidized castor oil. The preferred grade of castor oil is a low acid, low volatile grade available commercially as a "DB" castor oil obtained from The Baker Castor Oil Company.

The preferred prepolymers, which are more fully disclosed in our copending application, can, for example, be prepared by combining DB castor oil, propylene glycol monoricinoleate and an arylene diisocyanate. This mixture should be heated for one hour at 50° C. However, other temperatures from about 20° C. to 100° C. may be satisfactorily employed. It has been found that if the mixture is heated at temperatures as high as 130° C. and above, the viscosity of the prepolymer is so high that it cannot be handled readily.

The propylene glycol monoricinoleate can be represented by any such commercial product as "Flexricin 9" available from The Baker Castor Oil Company. It has been found that better products are obtained if the commercial product is treated to reduce the soap content to below .1% and dried to below .1% volatility, and if the product used has a hydroxy value of 290±3. Products with a wider range of hydroxyl value, say 290±20, and also higher soap and moisture content can be used, but the preparation is considerably more difficult to handle.

A further highly advantageous result obtained from combining propylene glycol monoricinoleate and castor oil is the marked reduction of so-called "bubbling" when the elastomers of this invention are cast. The reaction product of commercial propylene glycol monoricinoleate and tolylene diisocyanate bubbles badly when cured with compounds containing active-hydrogen groups because of the carbon dioxide obtained in the reaction product. However, when the propylene glycol monoricinoleate is combined with castor oil, this so-called "bubbling" is reduced, and by limiting the presence of soap and moisture normally found in commercial propylene glycol monoricinoleate to below .1% respectively, further reduction in bubbling is accomplished.

The esters of the hydroxy carboxylic acids of at least 12 carbon atoms are used in a weight proportion with castor oil of about 80 to 40% of the ester to about 20 to 60% castor oil, the preferred proportion being about 61 to 63% of the ester to about 39 to 37% castor oil.

It has also been found that about 2 to 3 NCO equivalents of the organic diisocyanate per equivalent of hydroxy group in the mixture of castor oil and the ester provide a useful range of prepolymer compositions.

The ingredients used to prepare this class of prepolymers may be simply mixed together in any order. In practice, it is preferred that the castor oil be mixed with the ester of the hydroxy carboxylic acid, i.e., prior to reaction with the organic diisocyanate.

The reaction product of castor oil, an ester of a hydroxy carboxylic acid of at least 12 carbon atoms and an arylene diisocyanate results in a prepolymer which is a thick syrupy liquid. The prepolymer obtained is reacted with the curing agent, which is an ester of a polyhydric alcohol of at least four hydroxy groups and an aliphatic acid of at least 12 carbon atoms and one or more hydroxy and/or epoxy groups per molecule.

Other prepolymer compositions, as disclosed in the prior art, which may be used in the present invention, are obtained by the reaction of an organic diisocyanate with active-hydrogen containing materials such as polyesters, castor oils, polyester amides and polyalkylene ether glycols. These prepolymers can be prepared according to well-known procedures described in the art, and in particular in accordance with United States Patents Nos. 2,625,531 and 2,625,532.

The polyesters reacted with the organic diisocyanate can be prepared by the reaction of two bifunctional reactants, one being a dibasic carboxylic acid and the other a glycol. The polyester amides of the present invention can be prepared by the reaction of a dibasic carboxylic acid with diamines or amino alcohols. The polyesters preferably have a hydroxy number from about 40 to about 100 and an acid number from 0 to 7.

Illustrative of the dibasic carboxylic acids, preferably those whose carboxyl groups are attached to terminal carbons that may be used in the preparation of the polyesters and polyester amides, include succinic, glutaric, adipic, pimelic, maleic, malonic, fumaric, terephthalic, citric, etc. Among the glycols which may be used in the formation of the polyesters are ethylene glycol, propylene glycol, 1,3-tolylene glycol, triethylene glycol, butylene glycol, hexamethylene glycol, decamethyene glycol, and glycerine monoethers. Among the diamines which are useful in the formation of the polyester amides are those which contain at least one primary amino group, including as representative examples, ethylene diamine, propylene diamine, tetramethylene diamine, m-phenylene diamine and 3,3'-diaminodipropyl ether. Primary amino alcohols useful in the formation of polyamides include 3-aminopropanol, 6-aminohexanol, 4-aminobutanol, etc.

Polyalkylene ether glycols, which are useful in the preparation of the prepolymers by reaction with an organic diisocyanate, can be represented by the formula $HO(RO)_nH$ in which R stands for an alkylene radical such a methylene ethylene, propylene, etc. and $n$ is an integer greater than 1. These polyalkylene ether glycols have molecular weights of at least 750. The preparation of these polyalkylene ether glycols and their reaction with organic diisocyanates, to produce prepolymer compositions, can be carried out according to United States Patents 2,702,797 and 2,692,873. Satisfactory prepolymers can be obtained by reacting from about 2 to 12 moles of diisocyanate per mole of polyalkylene ether glycol.

The preparation of the curing agents useful in the present invention is exemplified by the preparation of pentaerythritol monoricinoleate.

EXAMPLE 1

100 pounds of ricinoleic acid (available as P-10 from The Baker Castor Oil Company) is charged into a reactor and strong agitation started. 38.9 pounds of monopentaerythritol (available under the trade name Monopentek from Heyden Chemical) is added. The reactor is closed and a water-cooled take-off condenser attached. The reaction mixture is heated to 225° C. for three hours, the water formed being removed constantly. After the three-hour reaction period, vacuum is applied to the reactor. The mixture is allowed to react at 225° C. under vacuum until an acid number of 5 or lower is reached. The reaction mixture is then cooled to 110° C. and filtered to remove unreacted monopentaerythritol. The filtered product is illustrative of the pentaerythritol monoricinoleate used in this application as a curing agent.

The following examples are illustrative of the preparation of prepolymer compositions obtained by reacting an organic diisocyanate with active-hydrogen containing polymeric materials.

EXAMPLE 2

Charge 2630 pounds of tolylene diisocyanate (2,4/2,6 of 80/20 proportion by weight) of the high or low acid type (acidity of 0.010 to 0.015% preferred) to the reactor. Prepare a blend of 1035 pounds of DB castor oil and 1615 pounds of propylene glycol monoricinoleate. Approximately 880 pounds of the blend of castor oil-propylene glycol monoricinoleate is added in 20 minutes and allowed to react. By resorting to cooling, the temperature of the reaction mass is allowed to rise only to 35° C. If it goes higher, discontinue reaction until it drops to 35° C. before continuing the addition. Add another 880 pounds of the blend in 20 minutes. The maximum temperature now should be about 43° C. If higher, wait until it subsides to 43° C. Add the balance of the blend in about 20 minutes. Allow the temperature to rise and shut off cooling at 45° C. However, do not allow the temperature to rise to above 50° C. If necessary, cool or heat the material to 50° C. and maintain that temperature for 1½ hours. Discharge and package the prepolymer.

This prepolymer will have the following approximate properties: Viscosity (Fenske) 127 stokes, specific gravity at 25° C.=1.111, percent NCO=14.4±4, color (Gardner)=4.

EXAMPLE 3

Following the procedure of Example 2, a prepolymer was prepared based on:

| | Parts by wt. |
|---|---|
| Ethylene glycol monoricinoleate | 62.0 |
| DB castor oil | 38.0 |
| Tolylene diisocyanate | 90.4 |

This prepolymer composition has the following approximate properties: Viscosity (Fenske)=390 stokes, specific gravity at 25° C.=1.108, percent NCO 13.7±1, color=light amber.

EXAMPLE 4

To a mixture of 305.0 grams of castor oil and 53 grams of epoxidized castor oil (hydroxyl value 225) was gradually added with agitation 242 grams of 2,4/2,6 (80:20 proportion by weight) toluene diisocyanate. Equivalents of diisocyanate per equivalent hydroxy group were 2.5 to 1. After the exotherm had subsided, the reaction mixture was heated to 110° C. for one hour. After cooling to room temperature the prepolymer had a viscosity of 330 poises.

EXAMPLE 5

Following the procedure of Example 2, a prepolymer was prepared based on:

| | Parts by wt. |
|---|---|
| DB castor oil | 62 |
| Tolylene diisocyanate (80/20 type) | 38 |

To the prepolymer composition there is added, as a curing agent, pentaerythritol monoricinoleate or other ester of a polyhydric alcohol of at least four hydroxy groups and an aliphatic acid of at least 12 carbon atoms and one or more hydroxy and/or epoxy groups, to obtain an elastomeric product. The curing process may be carried out at room temperature or at elevated temperature (e.g. 50° C. to 150° C.).

If it is desired to carry out the reaction at room temperature, it is expedient to add a catalyst to speed up the reaction. Suitable catalysts are various organic amines such as dimethylaminoethanol, triethylenediamine, triethylamine, tetramethyl butane diamine, or tin salts such as stannous octoate or dibutyl tin dilaurate.

The following is an outline of the procedure that may be used for a room-temperature cure and a heat cure.

Procedure for room temperature cure

A suitable catalyst is added to the curing agent. The catalyst and curing agent are mixed in the correct proportions with the prepolymer until completely homogeneous. The mixture is then degassed from one to three minutes at 5 to 10 mm. mercury pressure. The degassed mixture is then poured into molds and cured at room temperature.

Procedure for heat cure

The prepolymer and curing agent are first placed separately in a vacuum oven and degassed at 50 to 60° C. for 10 to 30 minutes at 5 mm. mercury pressure or at least until the foam, which initially appears, collapses. At the end of the degassing period, the vacuum is broken and the correct amount of the curing agent is added to the prepolymer to effect the cure. After thoroughly mixing the reactants until homogeneous, the prepolymer curing agent mixture is re-evacuated at 60° C. for two to three minutes at 5 mm. mercury pressure to remove air introduced during the mixing. The degassed mixture is then poured into molds and cured for four hours at about 100° C. The curing can also be initially commenced at a lower temperature such as 80° C. for the first two hours and the temperature is then raised to about 100° C. for the next two hours. The curing rate can be accelerated easily by increasing the temperature.

The amount of curing agent added to the prepolymer composition should be sufficient to react with the free isocyanate groups remaining after the preparation of the prepolymer, but preferably not too low an amount or too large an excess is used. Too low an amount of curing agent tends to make the elastomeric material too hard and increases the cost of the product. Too large an excess of the curing agent causes it to act as a plasticizer and this is not always desirable. The amount of curing agent required to react properly with the prepolymer can be determined by the following calculation:

Parts of curing agent for 100 parts of prepolymer =

$$\frac{1,335 \times \text{percent NCO (isocyanate) of prepolymer}}{\text{hydroxy value} + \text{acid number of curing agent}}$$

It is frequently useful to add a non-reactive ingredient to the elastomeric product as part of the final step to change the physical properties, reduce cost and/or plasticize the elastomer. The following materials have been found to be useful for this purpose but should not be considered as a complete list of such compounds: chlorinated biphenyls and polyphenyls, hydroxylated rosin, dioctyl phthalate, acetylated glyceride of 12 hydroxystearic acid, diisooctyl phthalate and fillers such as calcium carbonate and silica.

In Examples 6–7 below, illustrating the heat cured elastomeric products of the present invention, the curing was carried out as follows. The prepolymer and pentaerythritol monoricinoleate are placed separately in a vacuum oven and degassed at 60° C. for 30 minutes at 5 mm. mercury pressure. At the end of this period the vacuum is broken and the stated amount of pentaerythritol monoricinoleate, as set forth in each example, is added to the prepolymer to effect the cure. After thoroughly mixing the reactants until homogeneous, the mixture is re-evacuated at 60° C. for three minutes at 5 mm. mercury pressure to remove air introduced during the mixing. The degassed mixture is then poured into open molds and cured for 2 hours at about 80° C. and is then cured for an additional two hours at about 100° C.

EXAMPLE 6

| | Parts by wt. |
|---|---|
| Prepolymer Example 2 | 100.0 |
| Pentaerythritol monoricinoleate | 59.2 |
| NCO/OH ratio | 1/1 |

EXAMPLE 7

| | Parts by wt. |
|---|---|
| Prepolymer Example 5 | 100.0 |
| Pentaerythritol monoricinoleate | 42.7 |
| NCO/OH ratio | 1/1 |

In Examples 8 and 9 below, illustrative of room temperature cured elastomeric products of the present invention, the curing was carried out as follows. Triethylenediamine, which is a solid catalyst, is dissolved in the curing agent, pentaerythritol monoricinoleate. This mixture is then mixed with the prepolymer in the correct proportions until homogeneous. The mixture is degassed for three minutes at 10 mm. mercury pressure. The degassed mixture is then poured into open molds and cured at room temperature. The cured product was permitted to age at room temperature for at least 7 days.

EXAMPLE 8

| | Parts by wt. |
|---|---|
| Prepolymer Example 2 | 100.0 |
| Pentaerythritol monoricinoleate | 58.0 |
| Chlorinated biphenyls (Aroclor 1254) | 36.3 |
| Triethylene diamine | 0.054 |
| NCO/OH ratio | 1/1 |

EXAMPLE 9

| | Parts by wt. |
|---|---|
| Prepolymer Example 5 | 100.0 |
| Penaerythritol monoricinoleate | 42.1 |
| Chlorinated biphenyls (Aroclor 1254) | 26.4 |
| Triethylene diamine | 0.04 |
| NCO/OH ratio | 1/1 |

The curing agents of the present invention can also be used to cure other commercially available prepolymer compositions such as Adiprene L (polytetramethylene ether glycol/diisocyanate prepolymer) available from E. I. du Pont as well as other prepolymers disclosed herein.

The following control elastomeric products were prepared. The products were heat-cured, in the manner described above, with conventional curing agents, the curing agent being indicated in each example.

EXAMPLE 10

| | Parts by wt. |
|---|---|
| Prepolymer Example 5 | 100.0 |
| Propylene glyrol monoricinoleate | 48.7 |
| NCO/OH ratio | 1/1 |

EXAMPLE 11

| | Parts by wt. |
|---|---|
| Prepolymer Example 2 | 100.0 |
| DB castor oil | 119.0 |
| NCO/OH ratio | 1/1 |

EXAMPLE 12

| | Parts by wt. |
|---|---|
| Prepolymer Example 5 | 100.0 |
| DB castor oil | 86.6 |
| NCO/OH ratio | 1/1 |

Tests were conducted on Examples 6 through 12 to determine the markedly improved tensile strength, good electrical properties as determined by the dielectric constant, dissipation factor and volume resistivity, and other physical properties of the elastomeric products of this invention. The physical properties of these examples were obtained from ⅛-inch slabs, aged for at least seven days at room temperature.

TABLE

| | Example | | | | | | |
|---|---|---|---|---|---|---|---|
| | 6 | 7 | 8 | 9 | 10 | 11 | 12 |
| Physical Properties: | | | | | | | |
| Tensile Strength, p.s.i. | 3,860 | 2,170 | 2,015 | 1,330 | 300 | 235 | 195 |
| Elongation, percent | 60 | 70 | 75 | 100 | 210 | 125 | 75 |
| Shore A Hardness | 100 | 97 | 83 | 73 | 45 | 54 | 55 |
| Moisture Absorption, percent, 10 days at 90° C., 100° RH | 4.0 | 1.8 | 0.7 | −2.0 | 2.4 | 2.6 | 1.6 |
| Electrical Properties: | | | | | | | |
| Dielectric Constant, 25° C.: | | | | | | | |
| 100 cycles | 3.51 | 3.66 | 3.82 | 4.68 | 6.41 | 5.53 | 6.19 |
| 1 kc | 3.33 | 3.11 | 3.53 | 3.64 | 3.83 | 4.23 | 4.77 |
| 10 kc | 3.27 | 2.96 | 3.31 | 3.29 | 3.22 | 3.35 | 4.04 |
| 100 kc | 3.16 | 2.87 | 3.12 | 3.08 | 3.00 | 3.00 | 3.34 |
| Dissipation Factor, 25° C.: | | | | | | | |
| 100 cycles | 0.016 | 0.030 | 0.027 | 0.043 | 0.108 | 0.154 | 0.045 |
| 1 kc | 0.011 | 0.019 | 0.021 | 0.034 | 0.076 | 0.183 | 0.074 |
| 10 kc | 0.007 | 0.012 | 0.016 | 0.024 | 0.036 | 0.109 | 0.042 |
| 100 kc | 0.005 | 0.009 | 0.012 | 0.018 | 0.018 | 0.044 | 0.018 |
| Volume Resistivity, 25° C., ohm/cm | $1.36 \times 10^{15}$ | $1.86 \times 10^{15}$ | $1.56 \times 10^{15}$ | $1.03 \times 10^{14}$ | $2.0 \times 10^{14}$ | $5.28 \times 10^{14}$ | $6.42 \times 10^{14}$ |

The results in the above table illustrate the highly improved tensile strength which is imparted by the use of the curing agents of the present invention. Examples 6 through 9 all showed a tensile strength ranging from about 1300 to about 3900, these examples all being elastomeric products cured with pentaerythritol monoricinoleate. On the other hand, Examples 10 through 12 showed a tensile strength of between about 200 and 300, these elastomeric products being cured with standard curing agents. Furthermore, there was also a significant improvement in the Shore A hardness. Also, the elastomeric products still retained good resistance to moisture. In addition, the electrical properties as determined by the dissipation factor, dielectric constant and volume resistivity of the elastomeric products of the present invention are at least as good as, and in most cases significantly superior to, the electrical properties exhibited by the control elastomeric products of Examples 10 through 12.

The elastomeric products of this invention are particularly useful for electronic potting and encapsulating electronic components. The elastomeric product of Example 9 is particularly suitable for potting undersea sonar equipment. The elastomeric products are also useful in coating systems.

While the examples cited herein are exemplary of the invention, it is to be understood that other modifications are within the skill of the art. The scope of the invention is defined by reference to the claims.

What is claimed is:

1. A non-foamed elastomeric product consisting essentially of the cured reaction product of: (1) the product of the reaction of (a) a polyester prepared from bifunctional ingredients including at least one dibasic carboxylic acid and at least one bifunctional reactant in which the functional groups are hydroxy groups, said polyester having a hydroxyl number from 40–100 and an acid number from 0–7, and (b) an arylene diisocyanate, and (2) a curing agent consisting essentially of an ester of a polyhydric alcohol of at least four hydroxy groups and a hydroxy and/or epoxy aliphatic acid of at least 12 carbon atoms.

2. A non-foamed elastomeric product according to claim 1 wherein the curing agent is pentaerythritol monoricinoleate.

3. A non-foamed elastomeric product consisting essentially of the cured reaction product of (1) the product of the reaction of a polyalkylene ether glycol having a molecular weight of at least about 750 and an arylene diisocyanate wherein the arylene diisocyanate is used in an amount ranging from about 2 moles to 12 moles per mole of polyalkylene ether glycol and (2) a curing agent consisting essentially of an ester of a polyhydric alcohol containing at least four hydroxy groups and a hydroxy and/or epoxy aliphatic acid of at least 12 carbon atoms.

4. A non-foamed elastomeric product according to claim 3 wherein the polyalkylene ether glycol is polytetramethylene glycol.

5. A non-foamed elastomeric product according to claim 3 wherein the curing agent is pentaerythritol monoricinoleate.

6. A non-foamed elastomeric product consisting essentially of the cured reaction product of (1) the product of the reaction of castor oil, an alkyl glycol ester of a hydroxy carboxylic acid of at least 12 carbon atoms and an arylene diisocyanate which comprises reacting from about 2 to about 3 NCO equivalents of the diisocyanate per equivalent of hydroxy group in the mixture of castor oil and ester, wherein the ester and castor oil are used in a weight proportion of about 80% to 40% of the ester to about 20% to 60% castor oil, said reaction of castor oil, ester and diisocyanate being carried out at a temperature from about 20° C. to 100° C., and (2) a curing agent consisting essentially of an ester of a polyhydric alcohol containing at least four hydroxy groups and a hydroxy and/or epoxy aliphatic acid of at least 12 carbon atoms.

7. A non-foamed elastomeric product according to claim 6 wherein the polyhydric alcohol of at least four hydroxy groups is selected from the class consisting of pentaerythritol, erythritol, arabitol, mannitol, sorbitol, sucrose and cellulose and the aliphatic acid, reacted with the polyhydric alcohol to form the ester, is selected from the class consisting of ricinoleic acid, 12-hydroxystearic acid, hydroxy palmitic acid, hydroxy pentadecanoic acid, hydroxy myristic acid, and hydroxy cerotic acid.

8. A non-foamed elastomeric product according to claim 6 wherein the ester of (1) is the lower alkyl glycol ester of ricinoleic acid.

9. A non-foamed elastomeric product according to claim 6 wherein the ester of (1) is propylene glycol monoricinoleate.

10. A non-foamed elastomeric product according to claim 6 wherein the ester is ethylene glycol monoricinoleate.

11. A non-foamed elastomeric product according to claim 6 wherein the curing agent is pentaerythritol monoricinoleate.

12. A non-foamed elastomeric product according to claim 7 wherein said ester and castor oil are used in a weight proportion of about 61% to about 63% of the ester to about 39% to about 37% castor oil.

13. A non-foamed elastomeric product according to claim 8 wherein the curing agent is pentaerythritol monoricinoleate.

14. A non-foamed elastomeric product consisting essentially of the cured reaction product of (1) about 100 parts by weight of the product of the reaction of castor oil, propylene glycol monoricinoleate, and tolylene diisocyanate which comprises reacting from about 2 to about 3 NCO equivalents of the diisocyanate per equivalent of hydroxy group in the mixture of castor oil and ester, wherein said ester and castor oil are used in a weight proportion of about 61% to 63% of the ester to 39% to 37% castor oil, said reaction of castor oil, ester and diisocyanate being carried out at a temperature of about 50° C., and (2) a curing agent consisting essentially of about 59.2 parts by weight of pentaerythritol monoricinoleate.

15. A non-foamed elastomeric product consisting essentially of the cured reaction product of (1) about 100 parts by weight of the product of the reaction of castor oil, propylene glycol monoricinoleate, and tolylene diisocyanate which comprises reacting from about 2 to about 3 NCO equivalents of the diisocyanate per equivalent of hydroxy group in the mixture of castor oil and ester, wherein said ester and castor oil are used in a weight proportion of about 61% to 63% of the ester to 39% to 37% castor oil, said reaction of castor oil, ester and diisocyanate being carried out at a temperature of about 50° C., (2) a curing agent consisting essentially of about 58 parts by weight of pentaerythritol monoricinoleate, (3) about 36.3 parts by weight of chlorinated biphenyl, and (4) a minor amount of triethylene diamine.

References Cited

UNITED STATES PATENTS

| | | |
|---|---|---|
| 3,037,947 | 6/1962 | Elkin. |
| 3,001,958 | 9/1961 | Swarcman. |
| 2,994,674 | 8/1961 | Rudkin et al. |
| 2,772,245 | 11/1956 | Simon et al. |

OTHER REFERENCES

Polyurethanes Chemistry and Technology; Part II, Saunders et al., Interscience Publishers, N.Y., 1964, pages 340–343, 449, 450.

(Other references on following page)

OTHER REFERENCES

"Castor Polyols for Urethane Foams," The Journal of the American Oil Chemists' Society, Ehrlich et al., vol. 36, April 1959, pages 149–154.

"Solvent Blown Rigid Urethane Foams From Castor-Based Polyols," Lyon et al., Journal of the American Oil Chemists' Society, vol. 38, May 1961, pages 262–266.

DONALD E. CZAJA, *Primary Examiner.*

L. J. BERCOVITZ, *Examiner.*

C. W. IVY, *Assistant Examiner.*